No. 753,912. PATENTED MAR. 8, 1904.
C. PERCY, Jr.
GEAR LOCK.
APPLICATION FILED JAN. 6, 1904.
NO MODEL.
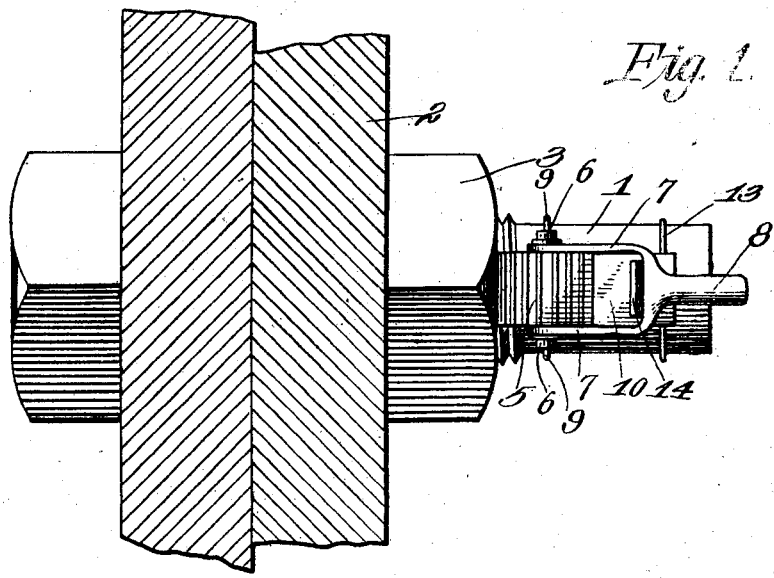
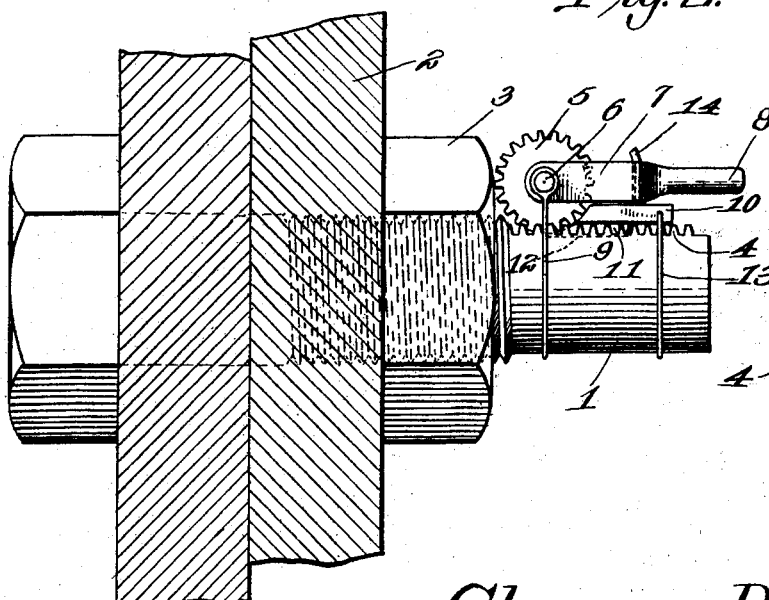
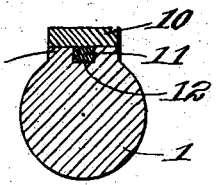
Clarence Percy Jr.,
Inventor.

No. 753,912. Patented March 8, 1904.

UNITED STATES PATENT OFFICE.

CLARENCE PERCY, JR., OF WAKEFIELD, LOUISIANA.

GEAR-LOCK.

SPECIFICATION forming part of Letters Patent No. 753,912, dated March 8, 1904.

Application filed January 6, 1904. Serial No. 187,938. (No model.)

*To all whom it may concern:*

Be it known that I, CLARENCE PERCY, Jr., a citizen of the United States, residing at Wakefield, in the parish of West Feliciana and State of Louisiana, have invented a new and useful Gear-Lock, of which the following is a specification.

My invention relates to gear-locks, and has for its objects to produce a simple inexpensive device of this character which in practice may be employed in connection with various classes of machinery for locking certain parts thereof against movement and one which may serve as a lock in other connections—such, for example, as a nut-lock, the latter application of which being illustrated herein.

To these ends the invention comprises the novel features of construction and combination of parts more fully hereinafter described.

In the accompanying drawings, Figure 1 is a top plan view of my device as applied to a bolt. Fig. 2 is a side elevation of the same. Fig. 3 is a detail view.

Referring to the drawings, 1 designates a bolt extended through a body 2 and having a removable nut 3 applied thereto, these parts, except as hereinafter specified, being of the ordinary construction. In accordance with my invention there is provided upon the bolt beyond the nut 3 a rack 4, on which is mounted for travel in a direction longitudinally of the bolt a primary locking member or gear 5, the teeth of which are adapted to mesh with the teeth of the rack during the movement of the member for engagement or non-engagement with the nut 3, which latter it serves to lock against rotation. The member 5 has laterally-extending trunnions 6, upon which is pivoted the spaced arms 7 of a bifurcated engaging and operating device or lever 8, said trunnions serving also as a bearing for the ends of an attaching band or element 9, which passes in the form of a loop around the bolt. When in engagement with the nut, the primary member or gear 5 is in turn locked by a secondary locking member or wedge 10, having upon its inner face a web or spline 11, seated and designed for travel in a groove 12, provided longitudinally of the bolt, while the inner end of the web is sharpened, as herein shown, and curved to conform to the peripheral curvature of the gear 5. The secondary member or wedge is secured to the bolt by an attaching band or element 13 and has projecting normally at right angles from its outer face a comparatively heavy retaining-spring 14 or its equivalent, which when the parts are in locking position projects between the arms 7 of and is engaged by the lever 8, which thus retains the wedge 10 in locking position relative to the gear 5, said lever serving the further function of an operating device by means of which the gear is moved to and from nut-engaging position.

In practice after the gear has been brought to engagement with the nut the secondary member or web is forced inward, which causes it to lift the teeth of gear 5 somewhat out of mesh with the rack and at the same time exerts an upward pull upon the attaching element 9, causing the latter to bind tightly upon the bolt. The lever 8 is then swung into engagement with spring 14, thereby fastening the lever and at the same time securing the wedge against accidental retrograde movement.

It will be seen from the foregoing that I produce a simple inexpensive device, which is admirably adapted for the attainment of the ends in view and one which, aside from the application herein illustrated, may be employed in various other connections. In attaining these ends I do not limit myself to the precise details herein set forth, inasmuch as various changes may be made without departing from the spirit or scope of the invention.

Having thus described my invention, what I claim is—

1. In a device of the class described, the combination with a rack, of a primary locking member traveling thereon and adapted for movement into engagement with a body, a secondary locking member movable into engagement with the primary member, and means for securing the secondary member in locking position.

2. In a device of the class described, the combination with a rack, of a toothed primary locking member traveling thereon and adapted for movement into engagement with a body, a secondary locking member movable into engagement with the primary member, and means for securing the secondary member in locking position.

3. In a device of the class described, the combination with a rack, of a pinion traveling thereon and adapted for movement into engagement with a body, a wedge movable into engagement with the pinion, and means for securing the wedge in locking position.

4. In a device of the class described, the combination with a rack having a longitudinal groove, of a locking-pinion traveling on the rack and adapted for movement into engagement with a body, a wedge movable into engagement with the pinion and having a spline engaging the groove and means for securing the wedge in locking position.

5. In a device of the class described, the combination with a rack, of a pinion traveling thereon and adapted for movement into engagement with a body, a lever pivotally connected with the pinion, a wedge movable into engagement with the pinion, and a member carried by the wedge for engagement by the lever to secure the wedge in locking position.

6. In a device of the class described, the combination with a rack, of a pinion traveling thereon and adapted for movement into engagement with a body, a wedge movable into locking engagement with the pinion, and a lever operatively connected with the pinion and adapted for engagement with the wedge to secure the latter in locking position.

In testimony that I claim the foregoing as my own I have hereto affixed my signature in the presence of two witnesses.

CLARENCE PERCY, Jr.

Witnesses:
FELIX CORRIGAN,
W. T. FORRESTER.